Aug. 26, 1969   L. M. J. P. BAIN ET AL   3,463,111
SLIDING AND TILTABLE HATCH COVERS
Filed Sept. 17, 1967   4 Sheets-Sheet 3
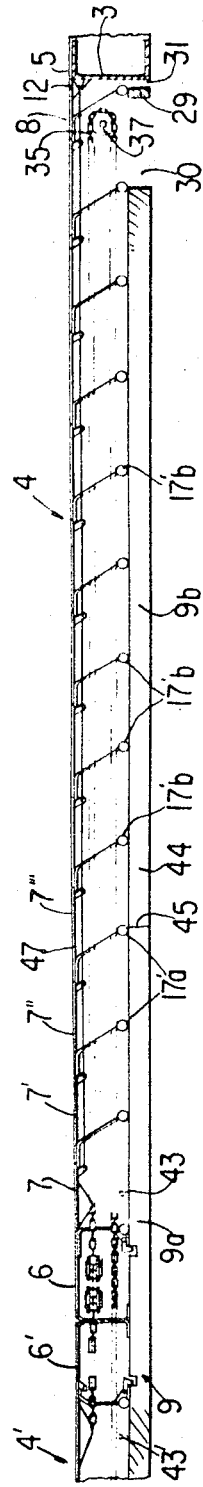
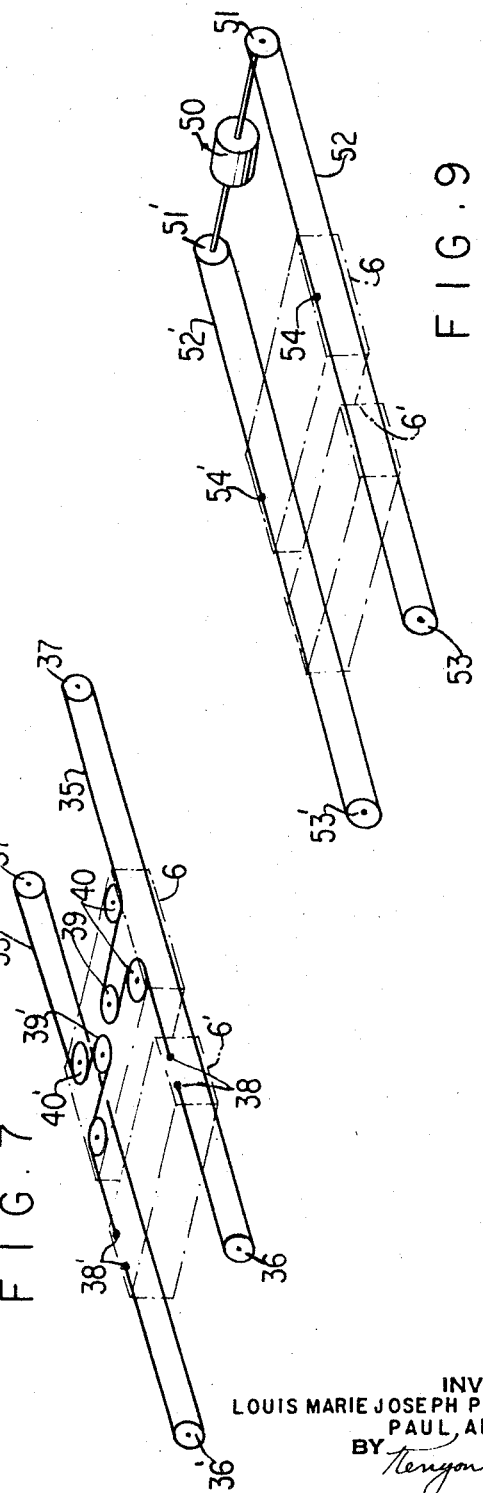
INVENTORS
LOUIS MARIE JOSEPH PIERRE BAIN
PAUL ANDRÉ MÈGE
BY
Kenyon & Kenyon
ATTORNEYS

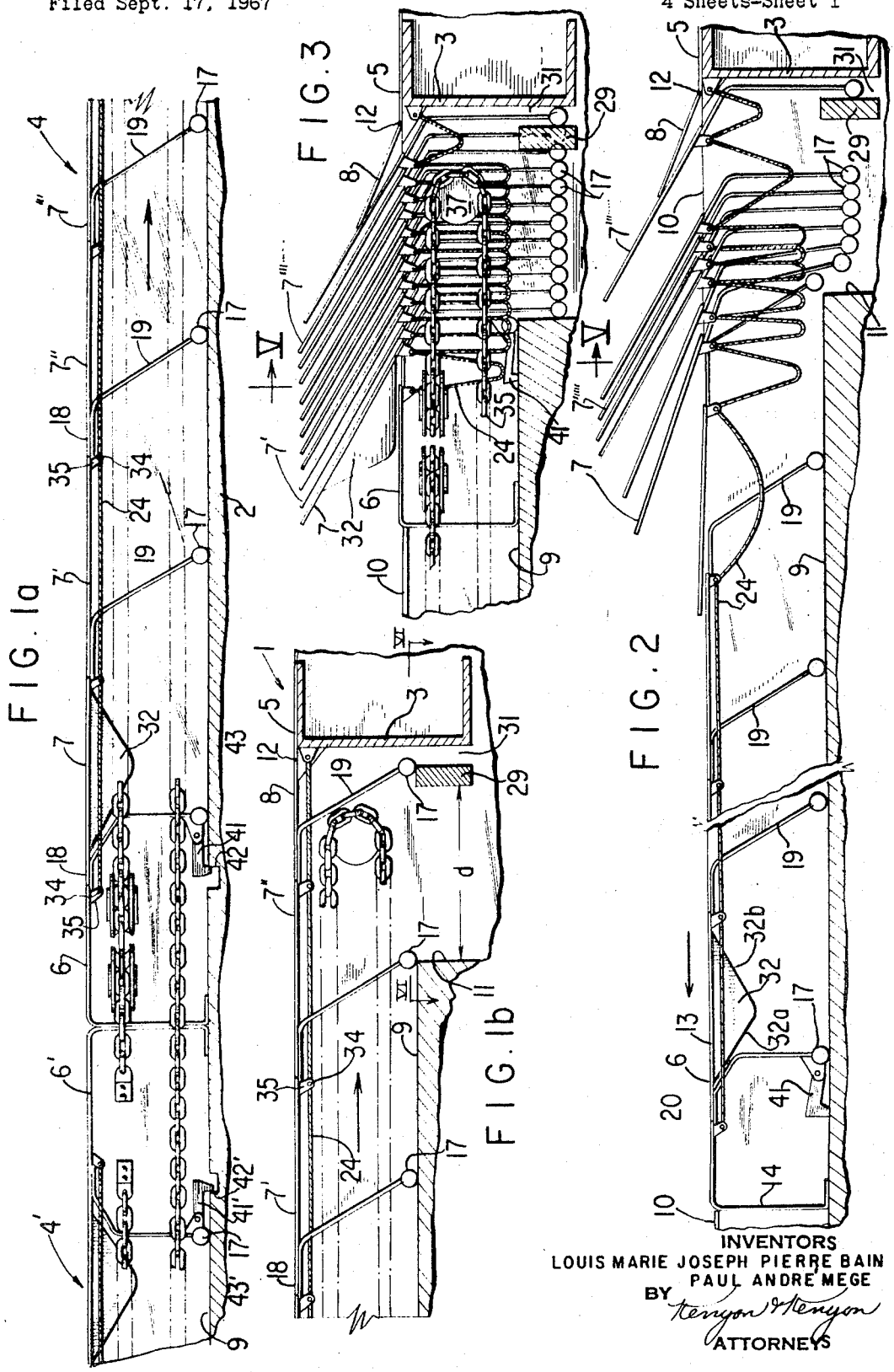

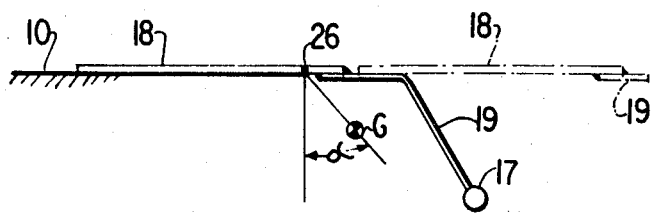
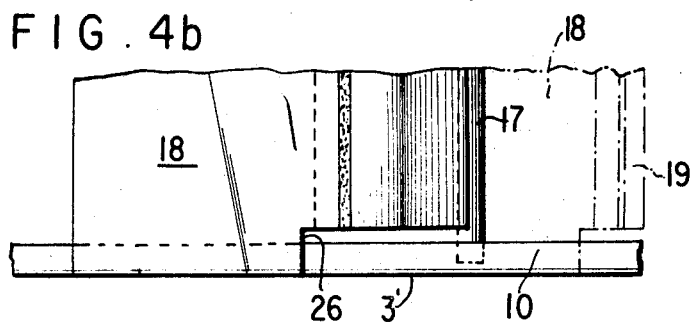
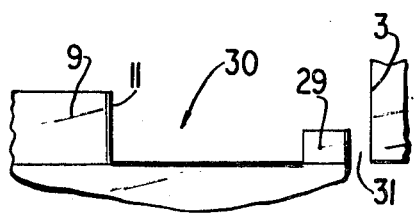
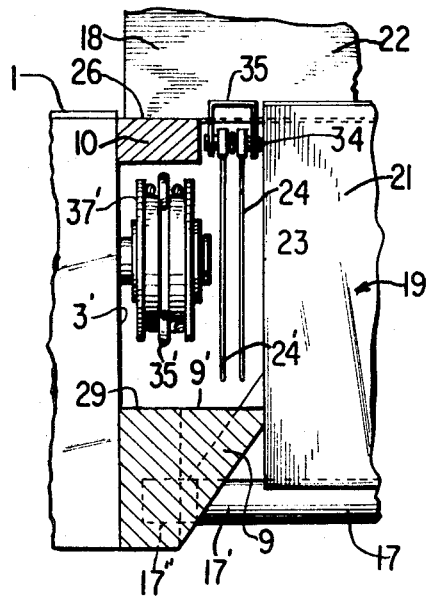

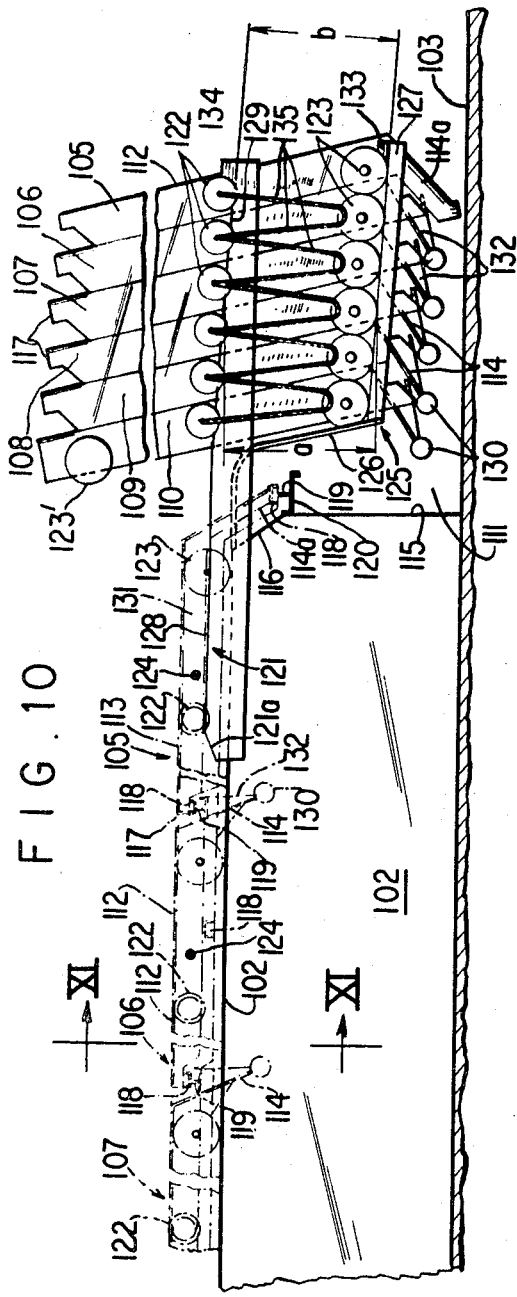

United States Patent Office 3,463,111
Patented Aug. 26, 1969

3,463,111
SLIDING AND TILTABLE HATCH COVERS
Louis Marie Joseph Pierre Bain, Paris, and Paul André Mege, Saint-Germain-en-Laye, France, assignors to Mac Gregor-Comarain, Paris, France, a company of France
Filed Sept. 17, 1967, Ser. No. 670,885
Claims priority, application France, Oct. 6, 1966, 79,001; Feb. 24, 1967, 96,504
Int. Cl. B63b *19/18;* E05d *15/12*
U.S. Cl. 114—202     15 Claims

ABSTRACT OF THE DISCLOSURE

A hatch construction comprising cover sections interconnected by flexible bonds, tiltable by gravity into upstanding open position within a stowage space and mutually overlapping in the closed position, and two overlying runways, extending along at least one portion of each longitudinal edge of the hatch and stowage space for at least temporarily guiding each cover section on two bearing points on either side of the transverse vertical plane passing through the centre of gravity of the cover section, the forward bearing point forming the tilting axis, whereas the horizontal portion of said lower runway is interrupted within said stowage space.

---

This invention relates to a type of covers for closing ships' hatchways and similar apertures.

The purpose is to have this means of closing obtained with metal cover sections of simple construction and also handled by a very simple device.

On the other hand, as the sections are nested within each other when the hatch is open, they require a reduced stowage space at the end of the hatchway.

In the accompanying drawings given by way of example only:

FIGURES 1a and 1b show a partial longitudinal sectional view of the central and end portions, respectively, of a hatch closed by a device according to one form of embodiment of the invention;

FIGURE 2 is a similar view of the right hatch cover shown in an intermediate position during the opening motion of the cover;

FIGURE 3 is a similar view showing the right cover in its stowed final position fully uncovering the hatch opening;

FIGURE 4a is a diagrammatic elevational view of a cover section in its hatch closing position;

FIGURE 4b is a top view corresponding to FIGURE 4a;

FIGURE 5 is a fragmentary cross-sectional view of the hatch taken, at a larger scale, upon the line V—V of FIGURE 3 and showing one lateral face, seen from the inside, of an intermediate cover section, tilted in its hatch opening stowed position;

FIGURE 6 is a partial top view taken, at a smaller scale, upon the line VI—VI of FIGURE 1b and showing the shape of the lower slideway adjacent the stowing space at one end of the hatch;

FIGURE 7 is a perspective diagrammatic view illustrating the basic principle of the joint operating arrangement for both aforesaid hatch covers;

FIGURE 8 is a fragmentary view at a reduced scale, similar to FIGURES 1a and 1b, of the hatch covers in their fully closed position;

FIGURE 9 is a diagrammatic perspective view illustrating the principle of a hatch cover driving arrangement operated by a motor provided at a stationary location;

FIGURE 10 is a fragmentary longitudinal outside lateral view of a hatch in a ship for example, in the vicinity of its end comprising a stowing space for the hatch cover and provided with a device according to an alternative form of embodiment of the invention, said view showing in solid lines a hatch cover in its hatch opening stowed position and in dash-and-dotted lines, some cover sections in their hatch closing final position;

FIGURE 11 is a partial cross-sectional view taken along the line XI—XI of FIGURE 10 of the preceding arrangement.

FIGURE 1a shows a part view of a closed hatchway. It is completed by FIGURE 1b which represents the hatchway end.

On these figures can be seen: the hatch end beam 3; the hatchway is closed by two covers 4 and 4' (FIGURE 8) composed of separate cover sections 7, 7', 7", etc.

In each cover, driving cover sections 6, 6' drive cover sections 7, 7', 7", etc. in either direction.

Each cover section is built from sheet-metal in a dihedral shape of which one face 18 is the horizontal part of the section and the other face 19 is the beam or web which provides the necessary stiffness to carry the loads laid on the horizontal face (FIGURE 4a). The beam is reinforced at its lower edge by a round bar 17 or a flat bar or any other convenient section of metal.

Elements 18 and 19 forming a cover section are assembled as follows: plate 18 remains flat. Plate 19 forming the beam or web is flanged at the upper end and this flange is welded under plate 18 as shown on FIGURE 4a. The flange of plate 19 is bent at a convenient angle, in principle equal to or above 90°.

The cover sections bear on the hatchway longitudinal structure:

(1) by horizontal plate 18 resting on a support 10 (FIGURE 5) welded on and along the vertical portion of each longitudinal coaming.

(2) through reinforcement 17 of beam 19 lying on another longitudinal support 9 (FIGURES 1a, 1b, 3 and 5) extending along each hatch coaming.

The position of each support 10 is such that plate 18 is flush with deck plate 1 when the hatch is closed.

Plate 18 is cut out at a portion 26 on either side and its width is therefore reduced from this portion so that it does not bear any more on supports 10 (FIGURES 4a and 4b).

Assuming that the centre of gravity of the cover section (FIGURE 4a) is at a suitable location at G, when reinforcement 17 bears no longer on supports 9, the cover section would tilt around the edge 26 and G would come in the vertical plane passing through 26 thereby giving an angle α of inclination to the cover section.

On the other hand, each cover section bears also by plate 18 on the flange of plate 19 of the next cover section (FIGURE 4a).

At the end of the hatchway, the last element 8 is hinged at 12 to the hatch end beam and bears with the opposite edge on beam 19 of the adjacent cover section (FIGURE 1b).

The last two cover sections 7', 7" bear on either side through reinforcements 17, the one on support 9, the other one on a similar support 29 but of reduced size (FIGURES 1b and 6).

Each support 9 ends at 11.

During opening, the cover sections are pushed altogether by the driving section 6, for instance when this section moves in the direction of the arrow (FIGURES 1a, 1b).

The movement transmitted to the last sections 7', 7" causes their reinforcements 17 to leave their supports 9 and 29 and to rotate about the edge 26 to reach an inclined position as stated hereinabove.

After all reinforcements 17 of the sections have left the supports 9 due to the pushing force of driving section 6, all sections are inclined and nested into each other at the end of the hatch coaming as shown on FIGURE 3.

Element 8, which is a simple plate, is lifted by the movement of the adjacent 7 section.

In order to maintain the section in an inclined and stable position, the section adjacent to driving section 6 is fitted on its bottom face with vertical plates 32 of suitable shape.

The sections are connected together by cables or chains 24 attached by pairs at points 34 to small brackets 35 (FIGURES 1 and 5).

Each bracket 35 is traversed by a pin 34 which is driven through the two thimbles of cables 24 which link the section respectively to the two adjacent sections.

FIGURE 2 shows the closing of the hatchway. The driving section 6, by moving in the direction of the arrow, pulls the sections one after the other by means of cables 24. Every sections tilts when its reinforcement 17 engages the edge of supports 9 and plate 18 takes a horizontal position bearing on the preceding section and on supports 10.

Reinforcement 17 bears on supports 9 and at the end of the movement, all sections have reached their normal closing position.

The movement of driving sections 6 and 6' is obtained by the device shown on FIGURE 7. An electric or hydraulic or pneumatic motor, not shown in the drawings drives the wheels 39, 39' which are rotating in opposite directions.

These wheels are sprocket wheels driving each one a chain 35, 35'. These chains are reeved on wheels 40, 40' respectively fitted on section 6 and, at each end of the hatchway, on wheels 36 and 37 or 36' and 37' which are fixed on the ship's structure.

The two ends of the chain 35 or 35' are fastened at two points 38 or 38' on the section 6'.

Chains 35 and 35' and their wheels are symmetrically placed on each side of the groups of cover sections 4 and 4'. Their plates and the positions of wheels 36, 37 or 36', 37' are shown on FIGURE 5.

Each section 6 or 6' can be locked by means of catches 41 falling in recesses 42 (FIGURE 1a) placed at convenient spots on supports 9.

It is readily seen that if one of the driving sections 6 or 6' is locked an the other unlocked, the starting of the driving motor actuating wheels 39 and 39' in either direction will cause through chain 35, 35' the movement of the unlocked section one way or the other.

Actuation of the locking catches 41 will be done by hand or by any type of remote control device.

Moving sections 6 and 6' can also be effected as shown on FIGURE 9. The motor is in that case fixed at 50 on the ship's structure. It drives the wheels 51, 51' which move chains 52, 52'. These chains are endless and are reeved around two idle pulleys 53, 53'.

When a group of cover sections has to be moved, chains 52, 52' are locked by a convenient means with one of sections 6 or 6'. Locking is done inside the considered section for instance at 54, 54' for section 6. When a section is locked with the chains, the starting of the motor 50 drives it in the suitable direction thus effecting the closing or opening of the corresponding group of sections.

All the foregoing refers to the closing of a hatchway or like aperture by two groups of cover sections with driving sections. But it is obvious that a hatchway can also be closed by means of only one group driven by one single driving section if the dimensions of the hatchway do not justify the use of two groups.

Driving sections 6 and 6' can also be moved by means of cables driven by any device situated outside the hatchway, for instance by a winch or crane.

The object of the modified type of covers shown on FIGURES 10 and 11 is to adapt the handling features of the preceding embodiment to the tight closing of weather deck hatchways of a ship.

FIGURE 10 shows the end of a hatchway with the longitudinal coaming 102 and the transversal coaming 115. This hatchway is closed by cover sections 105, 106 . . . 110.

In closed position, the cover sections are resting on the hatchway coamings and each one also bears on the next one by it own end opposite to its beam 114.

Sealing engagements are provided by means of joints 118 housed in channel bars and bearing on flat bars 119.

Each cover section comprises: one top plate 112, a beam 114 reinforced by a round bar 130 or by any other type of sectional part and vertical brackets 132. In addition, plate 112 is reinforced by longitudinal members 131 welded underneath.

At the hatchway end, the coaming 115 has its upper portion cut away at 116 to give passage to beams 114 of cover sections 106, 107 . . . 110 during the opening.

On the end cover section 105, the beam 114a closes the coaming cut out and carries sealing elements 118 which engage the flate bar 119 welded on the coaming ledge 120 and the end 116 of the longitudinal coaming.

Each cover section carries two wheels 123 and two grooved rollers 122. End section 110 on the left has two additional wheels 123' to support it when it rolls towards the stowing zone.

When the hatchway is closed, the sections bear on its periphery and on the other hand bar on each other as stated hereinbefore.

Opening of the hatchway comprises two steps:

(1) raising the cover sections to disengage them from the coaming and carrying them by wheels 123, (2) moving all cover sections from left to right.

The first operation is done by any convenient means which is not described.

Translative motion is imparted by giving the end cover section 110 a movement towards the right which will push all other cover sections. In this movement, the cover sections roll on the coaming ledge 104 by means of wheels 123.

When the cover sections arrive at the end of the hatchway, the wheels 123 leave the horizontal part of their runways and follow the extension thereof formed by ramps 126.

At this time, the grooved rollers have engaged ramps 121 and te cover section is carried by its wheels 123 and its rollers 122.

The centre of gravity of the cover section being at 124, the cover section will rotate as soon as wheels 123 engage the ramps 126. Each ramp 126 extends down to a suitable level at 125 and is followed by another substantially horizontal ramp 127. On their arrival at 125, the wheels 123 keep running on ramps 127. The cover section at this time has a predetermined inclination on the vertical (of about 10°) and from the position assumed at this time by rollers 122, each ramp 121, on which they are rolling, follows a direction parallel to ramp 127.

Under these conditions, the cover section, supported and guided by wheels 123 and 122, keeps moving parallel to itself while retaining the same angle of inclination. This angle is determined by the relative values of distances $a$ and $b$. $a$ is the distance between the two points of contact of wheels 122 and 123 with their respective ramps and $b$ is the distance between ramps 121 and 127.

At the end of their movement, the wheels 123 and 122 of cover section 105 are stopped by engagement with stops 133 and 134.

The other cover sections, which have the same angle of inclination, successively engage or nest in the adjacent cover sections on the right.

The arrangement of ramps 127 and 121 and of wheels 123 and 122 by keeping the cover sections in an inclined position, provents them from rocking around the rollers 122.

As a result, the operation is smooth, without bumping, either during the opening or closing.

The cover sections are connected together by flexible ropes 135 fastened on the axes of rollers 122.

To close the hatch, the cover section 110 is moved towards the left. The respective positions of wheels 122 and 123 cause this cover section to tilt to the horizontal position. The effect of the connecting elements 135 is to pull the other cover sections, one after the other, in a same movement.

FIGURE 11 is a cross-section taken upon the line XI—XI of FIGURE 10 and which shows the position of the various elements described hereinabove.

The cover section 110 acts as a driving section in the operation of the covers. It can be moved either by a motor fitted inside the section and driving sprocket wheels which mesh with fixed chains located on both sides of the hatchway, or it can be moved also by a power source situated outside of the hatchway and driving section 110 by means of ropes.

What we claim is:

1. A hatch and hatch cover construction comprising at least one cover consisting of a plurality of adjacent cover sections, interconnected by flexible connecting means and separately movable in substantial horizontal translation and individually tiltable by gravity into upstanding opening position in close order within a stowage space adjacent to the hatchway and inside the opening to be closed, said cover sections overlapping each other in their hatch-closing position and the end cover section, remote from said stowage space, being a driving cover section for the operation of the hatch cover; two stationary upper and lower runways extending in substantially parallel spaced overlying relationship along at least one portion of each longitudinal edge of at least said hatch and adapted to support and guide sidewise each one of at least some of said cover sections on at least two lateral longitudinally spaced bearing points, respectively, located on either side of the transverse vertical plane passing through the center of gravity of the associated cover section and behind the transverse vertical plane passing through the line by which said cover section bears in overlapping relationship upon the preceding cover section in the direction of closing, each forward baring point being adapted to engage the associated upper runway extending straight and substantially horizontally throughout the whole length of said hatchway and stowage space and to form the tilting axis, whereas each rear bearing point is adapted to engage the corresponding lower runway extending throughout the useful length of the hatchway and terminating at the forward end of said stowage space, towards the rear end of which is provided, on either side therof, a support member substantially on a level with and spaced from said lower runway for carrying the corresponding rear bearing point of the end cover section nearest to said stowage space in the closing position, said support member and rear bearing point being shifted sidewise outwards with respect to said lower runway.

2. An arrangement according to claim 13, wherein each lower runway terminates at the forward end of said stowage space, whereas towards the rear end of the latter is provided, on either side thereof, a support member for carrying the rear bearing point of the end cover section nearest to said stowage space in the closing position, said support member and rear bearing point being shifted sidewise outwards with respect to said lower runway, and said upper runway extending continuously throughout the whole length of the hatch and the stowage space.

3. An arrangement according to claim 13, wherein at least each intermediate cover section has substantially the shapeof an upward projecting, obtuse dihedron with a substantially horizontal transverse edge, the upper face of which, forming the top closing wall of the cover section, rests in the closing position sidewise upon said upper runways by means of two marginal longitudinal strips widening said upper face, and upon the rear end of the upper face of the preceding cover section, whereas the transverse bottom edge of the other face of said dihedron is reinforced to form a sliding skid engageable with said lower runways, the rear end edge of said marginal strips forming the transverse tilting axis of said cover section, located before the centre of gravity of said cover section and said cover sections being nestable into each other in interfitting relationship in their stowed position.

4. An arrangement according to claim 3, comprising a drive system for each hatch cover, consisting of two endless chains extending along either longitudinal side of the hatch, respectively, and reeved upon opposite end guide pulleys and operatively connected to a same reversible actuating motor, each chain having one run fixedly fastened, at least temporarily, to each forward end cover section of each hatch cover, which cover section is movable in horizontal translation only while remaining always in relative closing position.

5. An arrangement according to claim 4, comprising two oppositely moving hatch covers, closing each one a portion of said hatch while meeting together intermediate thereof and opening towards its opposite ends, respectively, a same run of each chain being fastened to the end cover section of one hatch cover and passing on guide sheaves carried by the forward end cover section of said other hatch cover to mesh with a drive wheel operatively connected to a single actuating motor mounted in the forward end cover section of said other hatch cover, whereas releasable locking means are provided to lock each forward end cover section with the stationary hatchway structure.

6. An arrangement according to claim 4, comprising two oppositely movable hatch covers, closing each one a portion of said hatchway while meeting together intermediate thereof and opening towards its opposite ends, respectively, and a stationary actuating motor operatively connected to that pair of end guide pulleys which is located at a same end of the hatch, both forward end cover sections of said hatch covers being removably fastened to a different one of the runs of each chain.

7. A hatch and hatch cover construction comprising at least one cover consisting of a plurality of adjacent rolling cover sections, interconnected by flexible connecting means and separately movable in substantially horizontal translation and individually tiltable by gravity into upstanding opening position in close order within a stowage space, said cover sections being provided each one, on either side thereof, with an intermediate tipping roller and with a running wheel at least at the rear end in the direction of closing, said cover sections overlapping each other in their hatch closing position and the end cover section, remote from said stowage space, being a driving cover section for the operation of the hatch cover; a pair of stationary upper and lower runways extending in spaced overlying relationship along each longitudinal side of said stowage space and along at least one adjacent portion of each longitudinal edge of said hatch and adapted to support and guide sidewise each cover section on each tipping roller and rear end running wheel thereof, respectively, which are located on either side of the transverse vertical plane passing through the center of gravity of the associated cover section and behind the transverse vertical plane passing through the line by which said cover section bears in overlapping relationship upon the preceding cover section in the direction of closing, each tipping roller being adapted to engage the upper runway extending into and throughout the whole length of said stowage space and to form the tilting axis, whereas each rear end running wheel is adapted to enage the lower runway, the main continuous and substantially horizontal level portion of which extends throughout the useful length of the hatchway and within said stowage space outside and adjacent to said hatch so as to form therein a guide ramp for the corresponding rear end wheel, consisting of a tilting portion adjacent to the main portion of said lower runway and sloping downwards towards said stowage space and of a directing portion merging into the bottom end of said tilting portion and extending in substantially parallel relation to the corresponding part of said upper runway for said tipping rollers, over at least substantially the length of the space effectively occupied by at least the lower end of the whole plurality of cover sections in their final tilted stowing position and at a distance from the level to said upper runway which is smaller than the space between the respective actual rolling contact bearing points of each cover section in its final tilted and stowed position, wherein said cover sections are sloping upwards towards the hatchway with a predetermined angle with respect to the transverse plane perpendicular to said directing portion, stop means being provided at the ends of said directing portion and of said upper runway within said stowage space, respectively.

8. An arrangement according to claim 7, wherein each upper runway extends in substatnially parallel relation to the associated lower runway over a length at least equal to the longitudinal spacing between the axes of the tipping roller and the rear end wheel, respectively, of each cover section, from that end of the hatch which is adjacent to the storage space.

9. An arrangement according to claim 8, wherein said directing portion of each guide ramp and the corresponding portion of the associated upper runway, supporting the whole plurality of cover sections in their final tilted stowing position, are substantially straight and sloping downwards in the direction of the stowing movement of translation.

10. An arrangement according to claim 9, wherein each cover section consists of a plate forming the top wall and stiffened by longitudinal reinforcing members and of a transverse beam forming the rear end wall and sloping downwards towards said stowing space while extending into the hatchway in the relative closing position, the upper edge of the transverse end wall of the hatch being cut out to allow the passage of the bottom parts of each cover section while in its relative closing position and means being provided to colse said cut out in the final closing position of said cover sections.

11. An arrangement according to claim 10, wherein said closure means are formed by the rear end wall of the end cover section nearest to said stowage space in the final closing position of said hatch cover.

12. An arrangement according to claim 11, comprising separable sealing means to form tight joints between the successive cover sections and between the latter and the edges of said hatch.

13. An arrangement according to claim 1, comprising a drive system for each hatch cover, consisting of two endless chains extending along either longitudinal side of the hatch, respectively, and reeved upon opposite end guide pulleys and operatively connected to a same reversible actuating motor, each chain having one run fixedly fastened, at least temporarily, to each forward end cover section of each hatch cover, which cover section is movable in horizontal translation only while remaining always in relative closing position.

14. An arrangement according to claim 13, comprising two oppositely moving hatch covers, closing each one a portion of said hatch while meeting together intermediate thereof, and opening towards its opposite ends, respectively, a same run of each chain being fastened to the end cover section of one hatch cover and passing on guide sheaves carried by the forward end cover section of said other hatch cover to mesh with a drive wheel operatively connected to a single actuating motor mounted in the forward end cover section of said other hatch cover, whereas releasable locking means are provided to lock each forward end cover section with the stationary hatchway structure.

15. An arrangement according to claim 13, comprising two oppositely movable hatch covers, closing each one a portion of said hatchway while meeting together intermediate thereof and opening towards its opposite ends, respectively, and a stationary actuating motor operatively connected to that pair of end guide pulleys which is located at a same end of the hatch, both forward end cover sections of said hatch covers being removably fastened to a different one of the runs of each chain.

References Cited

UNITED STATES PATENTS

| | | | |
|---|---|---|---|
| 2,853,131 | 9/1958 | Kummerman | 160—188 |
| 3,342,245 | 9/1967 | Caillet | 160—193 |

FOREIGN PATENTS

| | | |
|---|---|---|
| 809,625 | 2/1959 | Great Britain. |

ANDREW H. FARRELL, Primary Examiner

U.S. Cl. X.R.

160—188